UNITED STATES PATENT OFFICE.

HERBERT LEVINSTEIN, OF BLACKLEY, MANCHESTER, ENGLAND, ASSIGNOR TO COMPANY OF LEVINSTEIN LIMITED, OF MANCHESTER, ENGLAND.

PRODUCTION OF FAST-COLORED PRINTS.

1,157,705.        Specification of Letters Patent.        Patented Oct. 26, 1915.

No Drawing.      Application filed February 7, 1914.    Serial No. 817,165.

*To all whom it may concern:*

Be it known that I, HERBERT LEVINSTEIN, a subject of the King of Great Britain and Ireland, and a resident of Blackley, Manchester, in the county of Lancaster, England, have invented new and useful Improvements in the Production of Fast-Colored Prints, of which the following is a specification.

This invention relates to a printing paste and its utilization in the production upon vegetable fibers of fast printed shades. The printing paste contains formaldehyde or a substance capable of liberating formaldehyde when heated, a non-substantive dyestuff which will form an insoluble compound when heated with formaldehyde, and any desired suitable thickening agent. The paste is printed upon the fabric and is then steamed. The heat of steaming causes the formaldehyde to become active and render the dyestuff insoluble.

Among the dyestuffs which are particularly applicable for use according to this invention are those containing as an end component resorcin or homologues or substitution products of resorcin, but the invention is not limited to the use of such dyestuffs.

The following are examples of how non-substantive dyestuffs may be produced and utilized according to this invention in a printing paste containing a substance which will liberate formaldehyde when it is steamed.

Example 1: 239 parts of 2.5-aminonaphthol-7-sulfonic acid are dissolved with 60 parts of sodium carbonate to which are added 350 parts of hydrochloric acid (27% HCl) and then 69 parts of sodium nitrite. The diazo body so obtained is mixed with 110 parts of resorcin. 250 parts of soda are now added. Combination takes place very quickly and the new dyestuff is isolated in the usual way by means of salt. The paste so obtained can be directly used in the composition of a printing paste or it may be dried. A printing paste may be prepared by mixing together 20 parts of the above paste, 16 parts of hexamethylenetetramin solution of a strength obtained by mixing commercial 40% formaldehyde with the requisite amount of commercial 25% ammonia (the solution should be neutral to brilliant yellow paper), and 200 parts of starch paste (10%).

Cotton goods are printed with the paste so prepared, and, after drying, are steamed in the usual way. The heat of steaming liberates formaldehyde from the hexamethylenetetramin and causes the thus liberated formaldehyde to act upon the dyestuff and render it insoluble. A fast brown is obtained which is quite unaffected by boiling with soap.

Example 2: 143 parts of beta-naphthylamin are diazotized by means of 69 parts of sodium nitrite and the necessary quantity of hydrochloric acid. The diazo compound so produced is poured into a solution of 144.5 parts of mono-chlor-resorcin containing a sufficient quantity of soda to keep the solution alkaline. The resulting dyestuff is isolated by salting out. A printing paste is prepared by mixing together as in the preceding example and the goods are printed and treated as already described. A brown shade is produced.

If desired formaldehyde itself may be used instead of hexamethylenetetramin in the production of the printing paste, or any other substance capable of liberating formaldehyde on steaming may be employed.

The following table gives the constitution of other dyestuffs which may be utilized according to this invention and the shades produced by them after fixing with formaldehyde:

p-Aminoacetanilid+resorcin......................Orange.
Anilin+resorcin.................................Yellow orange.
Orthoanisidin+resorcin..........................Reddish orange.
Paroxylidin+resorcin............................Orange.
p-Aminophenol+resorcin..........................Orange.
Orthoaminophenol+resorcin.......................Red-brown.
Alpha-naphthylamin+resorcin.....................Brown.
Naphthionic acid+resorcin.......................Red-brown.
1.2-Aminonaphthol ether+resorcin................Brown.
2-Amino-8-naphthol-6-sulfonic acid+resorcin.....Brown.
2-Amino-5-naphthol-7-sulfonic acid+phloroglucin.Brown.
2-Amino-5-naphthol-7-sulfonic acid+naphtho-
  resorcin .....................................Brown.
p-Aminoacetanilid+orcinol ......................Orange.
p-Aminoacetanilid+m-aminophenol.................Orange brown.
Beta-naphthylamin+resorcin carboxylic acid
  (1.2.4) .....................................Brown.

What I claim is:—

1. The production of fast shades upon vegetable fabric by printing the fabric with a paste containing formaldehyde and a non-substantive dyestuff which will form an insoluble compound when heated with formaldehyde, and heating the applied paste upon the fabric to cause the formaldehyde to act upon the dyestuff and render it insoluble, substantially as set forth.

2. The production of fast shades upon vegetable fabric by printing the fabric with a paste containing a substance which will liberate formaldehyde when heated and a non-substantive dyestuff which will form an insoluble compound when heated with formaldehyde, and heating the applied paste upon the fabric to liberate formaldehyde and cause such liberated formaldehyde to act upon the dyestuff and render it insoluble, substantially as set forth.

In witness whereof I have hereunto set my hand in the presence of two subscribing witnesses.

HERBERT LEVINSTEIN.

Witnesses:
 WALTER W. BALL,
 F. HOOD.